Jan. 1, 1957  J. VIZZA  2,775,832
LICENSE PLATE HOLDER
Filed Jan. 20, 1955
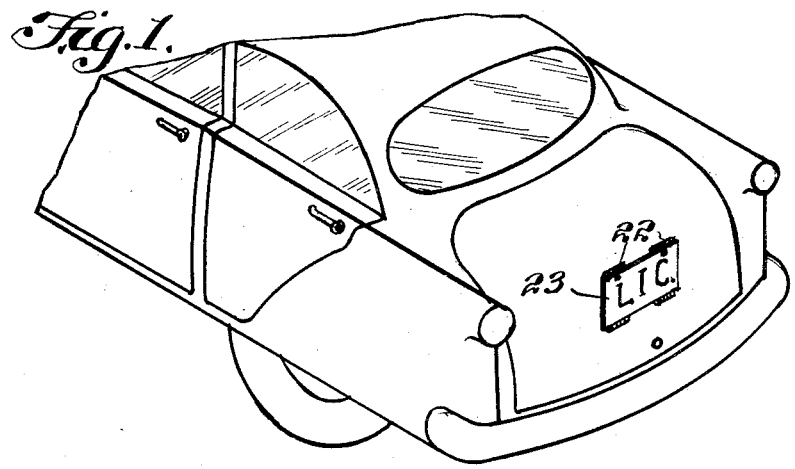
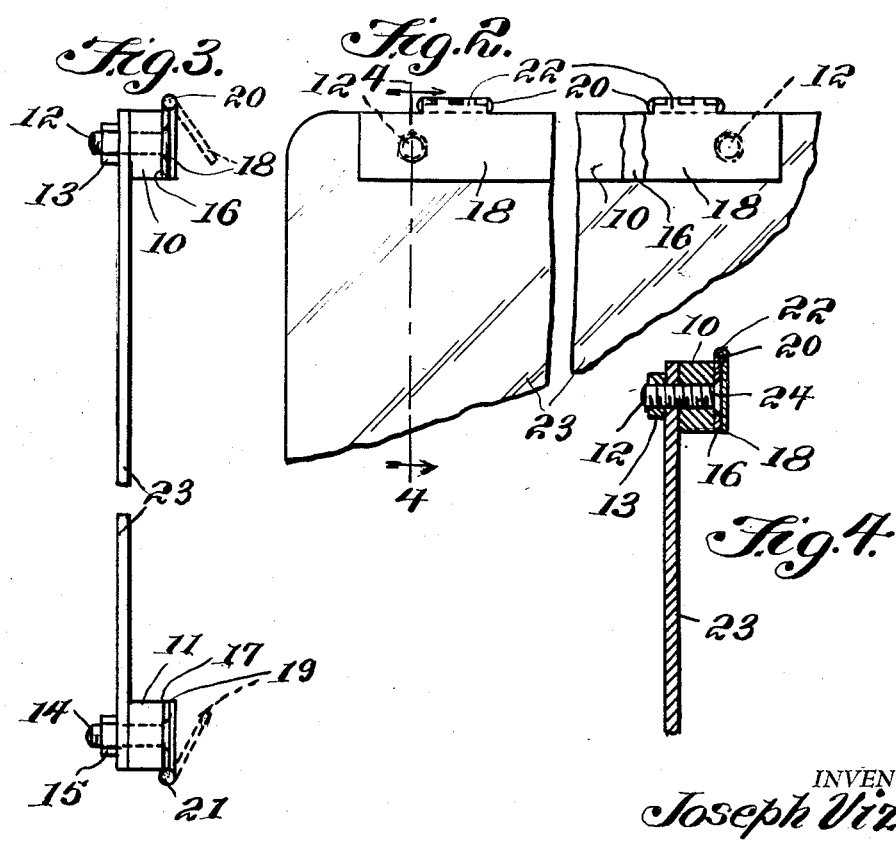
INVENTOR.
Joseph Vizza,
BY Victor J. Evans & Co.
ATTORNEYS

United States Patent Office 2,775,832
Patented Jan. 1, 1957

2,775,832
LICENSE PLATE HOLDER

Joseph Vizza, Belle Vernon, Pa.

Application January 20, 1955, Serial No. 483,124

1 Claim. (Cl. 40—125)

This invention relates to readily detachable devices for retaining license plates in position on motor vehicles, and in particular, magnets in the form of bars or arranged to provide a frame secured, particularly on upper and lower edges of a license plate whereby a license plate may readily be secured against the surface, particularly at the rear of the body of a motor vehicle, and wherein the license plate may readily be removed from one vehicle and placed on another such as is required with new and used car dealers.

The purpose of this invention is to provide means for readily attaching a license plate to a motor vehicle without bolts, screws, clips or other mechanical attaching means and wherein a license plate may readily be removed from one vehicle and placed upon another.

Motor vehicle dealers are often required to demonstrate several vehicles to the same customer and changing from one vehicle to another it is necessary to remove screws or bolts for attaching a license plate to a vehicle in order to remove the plate and it is also necessary to apply the screws and bolts to a mounting for retaining the plate on another vehicle. With this thought in mind, this invention contemplates a license plate having permanent magnets secured thereto whereby it is only necessary to hold the license plate against a metal part of a vehicle in order to attach the license plate to the vehicle.

The object of this invention is, therefore, to provide means for mounting magnets on a license plate whereby a license plate is adapted to be readily secured to and also readily removed from the body or other portions of a motor vehicle.

Another object of the invention is to provide magnetic means for retaining a license plate in position upon a motor vehicle in which the magnetic means are adapted to be applied to license plates now in use.

A further object of the invention is to provide means for magnetically mounting license plates on motor vehicles in which the mounting means is of a simple and economical construction.

With these and other objects and advantages in view, the invention embodies spaced parallel strips of magnetized material attached by bolts to upper and lower edges of a license plate and hinged aluminum shields positioned against surfaces of the magnets opposite to the surfaces upon which the license plate is positioned.

Other features and advantages of the invention will appear from the following description, taken in connection with the accompanying drawing, wherein:

Figure 1 is a perspective view showing the rear portion of a motor vehicle with a license plate having magnetic bars thereon positioned on the end surface of the cover of the trunk of the vehicle, the forward part of the vehicle being broken away.

Figure 2 is an elevational view showing an upper corner of a portion of a license plate with a magentic bar having a hinged aluminum shield thereon secured to the upper edge of the license plate.

Figure 3 is an end elevational view of the license plate with the parts as shown in Figure 2 and showing, in particular, the aluminum shields hinged to the magnetic bars and with plates of the shields extended outwardly in broken lines.

Figure 4 is a cross section through the upper portion of a license plate with the parts assembled, said section being taken on line 4—4 of Figure 2 and both plates of the aluminum shield being positioned against the surface of the magnetic bar.

Referring now to the drawing, wherein like reference characters denote corresponding parts, the magnetic license plate holder of this invention includes permanent magnets in the form of bars 10 and 11, studs 12 having nuts 13 thereon secured in the bar 10, studs 14 having nuts 15 thereon secured in the bar 11, and hinges including plates 16 and 17 secured to the magnets 10 and 11 and also aluminum shields or plates 18 and 19 pivotally connected to extended edges of the plates 16 and 17, respectively, with pins 20 and 21 extended through hubs of the plates such as indicated by the numeral 22, in Figure 2.

The bars 10 and 11 are secured by the studs and nuts to upper and lower edges of a license plate, as indicated by the numeral 23, with the studs extended through conventional bolt holes or openings of the plate and with the magnets in position the plate may be held against a bumper or rear wall of the body of the vehicle or against the trunk cover, as shown in Figure 1, and the magnetism of the bars will retain the license plate in position.

By this means a license plate may readily be transferred from one vehicle to another without using a screw driver or other bolt or nut gripping tool.

As illustrated in Figure 4, the plates 16 and 17 are retained in position against surfaces of the magnets 10 and 11 by peening edges of the heads in the plates, as shown at the point 24. It will be understood, however, that the aluminum shields may be secured to the magnets or bars by other suitable means.

Where it is desired to suspend the license plate from the conventional holder on the front or rear of the automobile to protect the finish on the automobile, the aluminum shields 18 or 19 may be positioned in the rear of the holder. The aluminum shields 18 or 19 can be swung outwardly, as shown in dotted lines in Fig. 3, to permit the magnet to engage the holder and then swing back into position in the rear of the holder.

It will be understood that modifications, within the scope of the appended claim, may be made in the design and arrangement of the parts without departing from the spirit of the invention.

What is claimed is:

In a license plate holder, the combination which comprises a license plate having openings therethrough, magnets in the form of bars positioned against upper and lower edges of the license plate, aluminum hinges providing shields positioned against the bars, and studs having nuts thereon extended through plates of the hinges and also through the bars and openings of the license plate for retaining the bars in assembled relation.

References Cited in the file of this patent

UNITED STATES PATENTS

| | | |
|---|---|---|
| 2,414,653 | Lookholder | Jan. 21, 1947 |
| 2,576,374 | Whitwell | Nov. 27, 1951 |
| 2,589,349 | Diefenback | Mar. 18, 1952 |

FOREIGN PATENTS

| | | |
|---|---|---|
| 486,466 | Canada | Sept. 16, 1952 |